July 12, 1966  F. B. RYAN  3,260,316

COULTER SPRING TRASH HOLDER

Filed May 5, 1964

INVENTOR

FRANCIS B. RYAN

BY Cameron, Kerkam & Sutton

ATTORNEYS

United States Patent Office 3,260,316
Patented July 12, 1966

3,260,316
COULTER SPRING TRASH HOLDER
Francis B. Ryan, Chariton, Iowa
Filed May 5, 1964, Ser. No. 364,905
1 Claim. (Cl. 172—516)

This invention relates to an improved and novel coulter spring trash holder designed to be used in conjunction with either rigidly fixed coulter wheels or pivoted coulter wheels used in conjunction with the blades of ditching and cable-laying machines and with farm plows and other farm machinery.

In the past considerable difficulty has been met during ditching, cable-laying and plowing operations due to the accumulation of twigs, trash, branches and other ground debris against the forward or cutting edge of the coulter wheel of such machines, which accumulation of trash ahead of and under the coulter wheel impedes the operation thereof and increases the amount of pull required to pull the coulter wheel and the following ditching, cable-laying or plowing blade through the ground. At times, the accumulation of such trash ahead of and about the coulter wheel completely impedes its rotation and operation and forward travel must be discontinued until the coulter wheel has been manually cleared of the aforesaid debris.

It is therefore an object of this invention to provide resilient spring means affixed to the lower surface of the coulter wheel bracket extending rearwardly and downwardly, laterally of each side of the forward or cutting edge of the coulter wheel, the said spring means being appropriately upwardly curved at their rearward extremities and bearing against the surface of the ground at the apices of these curved segments to hold trash downwardly against the ground, under the coulter wheel and prevent its clogging. These spring means, extending downwardly and rearwardly to each lateral extremity of the lower portion of the coulter wheel and bearing at their apices against the ground line forwardly of and laterally of the contact point of the coulter wheel therewith act to hold down or compress ground debris at the cutting point of contact of the coulter wheel with the ground whereby such trash will be cleanly cut by the coulter wheel and will not accumulate ahead of it or impede its free forward, cutting rotation.

A further object of this invention is to form such means of spring steel or analogous material in a unitary member consisting of a coil spring forward extremity, the two rearwardly extending parallel arms of the spring member comprising extensions of the two lateral coils of the spring. These arm members preferably extend downwardly and rearwardly an appreciable distance to the sides of the coulter wheel and are upwardly curved at their rearward extremities to provide a curved, freely-sliding apex at the rear extremity of each of said lateral spring arms.

It is a further object of this invention to provide such spring arm means which are readily adaptable to both the fixed and pivoted types of coulter wheel mounting brackets.

Other and further objects of this invention will become apparent as this specification proceeds.

Referring to the drawings, FIG. 1 is a reduced side view of a ditching and cable-laying machine showing a pivoted coulter wheel depending downwardly from the lower portion of the machine ahead of the ditching and cable-laying blade and provided with novel spring arms in accordance with the present invention;

Figure 1:
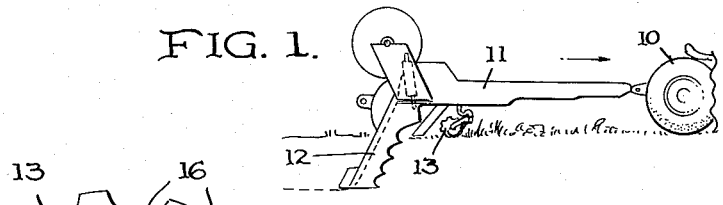
Figure 2:
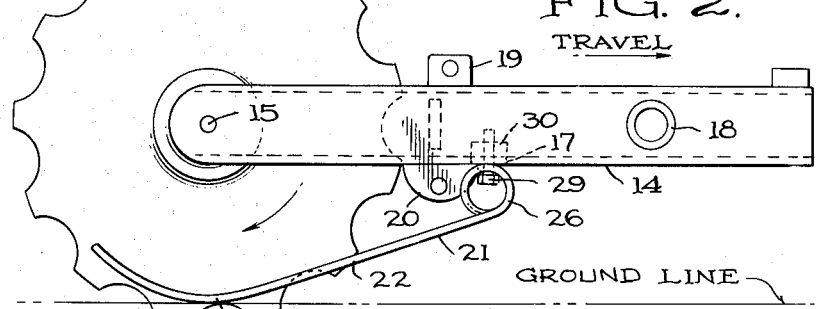
FIG. 2 is an enlarged, detailed side view, partially in phantom, of spring means in accordance with this invention, mounted to the under surface of the bracket means for a fixed type of coulter wheel.
Figure 3:
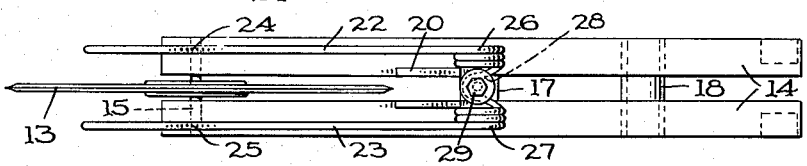
FIG. 3 is a bottom view of the embodiment of the invention shown in FIG. 2.
Figure 4:
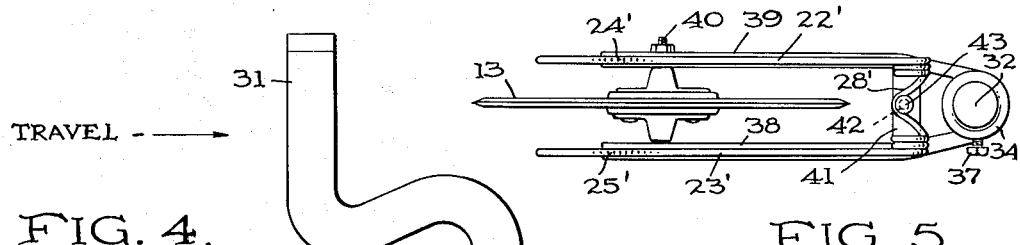
FIG. 4 is a side view, partially in phantom, of a swivel type coulter wheel provided with modified spring trash holder arms affixed to the lower surface of its bracket and extending rearwardly in parallel to each side of the coulter wheel.

In the drawings, FIG. 1 is a side view of a tractor and ditching and cable-laying trailer unit drawn thereby comprising tractor 10 pulling said ditching and cable-laying trailer 11, from the rear extremity of which depends ditching and cable-laying blade 12, preceded by coulter wheel 13, which is preferably pivotally mounted as shown, beneath the lower, rear surface of trailer 11 and is aligned ahead of ditching and cable-laying blade 12 to make an entry cut in the surface of the ground therefor. Depending upon the type of ditching trailer or plow involved, coulter wheel 13 may be pivotally mounted ahead of blade 12, beneath the trailer 11, as shown in FIGS. 1 and 4, or may be mounted at the extremity of fixed horizontal mounting means, as shown in FIG. 2. The pivotally mounted embodiment of the coulter wheel shown in FIG. 1 is also shown in detail in FIGS. 4 and 5 of the drawing.

As has been stated, it is a characteristic of coulter wheels of this type that in their travel across the surface of the ground ahead of the plow or the ditching and cable-laying blade, there is tendency for the wheel to catch or pick up loose debris, branches, trash, and so forth, which collects in front of the coulter wheel, impeding its rotation and its forward movement. The present invention is therefore designed to eliminate this highly undesirable effect and to trap and hold such debris under the rotating coulter wheel so that it may be cleanly cut thereby and will not pile-up or jam the coulter wheel.

Referring specifically to FIG. 2 of the drawing, coulter wheel 13 is shown rotatably mounted between paired bracket members 14 on axle 15 disposed between the rear extremities thereof. It will be noted that the outer periphery of coulter wheel 13 is preferably provided with serrations 16 and is sharpened for ready penetration into the surface of the ground. This penetration is usually to the depth of serrations 16, as shown in FIGS. 2 and 4.

As shown, brackets 14 are preferably disposed in parallel vertical planes and are fixedly joined together by cross bar 17 at their median and by cylindrical bearing 18 toward their forward extremity. Cylindrical bearing 18 is designed to be fitted over a lateral bar or axle disposed beneath the trailer body to permit of vertical adjustment of the entire coulter wheel bracket unit. Lugs 19 and 20 are provided on brackets 14 to mount and position the unit beneath the trailer.

Coulter spring member 21 is preferably made of a unitary piece of spring steel or analogous material, the working portions thereof comprising rearwardly depending arms 22 and 23 which are preferably parallel to each other and are smoothly curved upwardly at an obtuse angle at their apices 24 and 25. At their forward extremities arms 22 and 23 extend into coil spring members 26 and 27 which are joined at their center extremities by circular bight 28. As aforesaid, spring member 21 is preferably formed of one unitary piece of spring steel of heavy gauge and in the formation thereof the first step is the bending of the wire at its center portion to form horizontal bight 28. The extremities of the wire adjacent bight 28 are then respectively closely twisted about a suitable cylindrical mandrel to form two and a half turn spring members 26 and 27. The lower laps of the outer turns of springs 26 and 27 are then extended rearwardly and downwardly to form arms 22 and 23. At their rear extremities arms 22 and 23 are bent upwardly into smooth, obtuse curves with apices 24 and 25, designed to bear against the surface of the ground, as shown in FIGS. 2 and 4. Also, as shown, arms 22 and 23 are of such length that their apices 24 and 25 will bear against the surface of the ground just behind and laterally of the entry point of coulter wheel 13.

As shown in FIG. 2, the preferred manner of mounting this embodiment of coulter spring member 21 ahead of the coulter wheel is by means of a bolt 29 passed upwardly through bight 28 thereof; through a suitable bore in cross bar 17, nut 30 being provided over the threaded extremity of bolt 29. It will be noted that bight 28 is so positioned horizontally between lateral springs 26 and 27 that it is held flush against the lower surface of cross bar 17 by bolt 29. As shown in FIG. 2, arms 22 and 23 extend rearwardly and downwardly from springs 26 and 27 at an acute angle equidistant on each side of the leading edge of coulter wheel 13 with their respective curved apices 24 and 25 bearing against the surface of the ground laterally of and just behind the entering point of coulter wheel 13. The angularity of arms 22 and 23 may be varied depending upon the angular position of the coulter wheel bracket with respect to the beam of the trailer 11, it being essential that the apices 24 and 25 of the curved rear extremities of arms 22 and 23 bear against the surface of the ground laterally of and slightly behind the penetrating point of the coulter wheel 13. Such points of contact are necessary in order to depress and maintain ground litter firmly beneath arms 22 and 23 and apices 24 and 25 thereof at the moment of contact of the cutting edge of the coulter wheel with said compressed ground litter.

Figure 5:
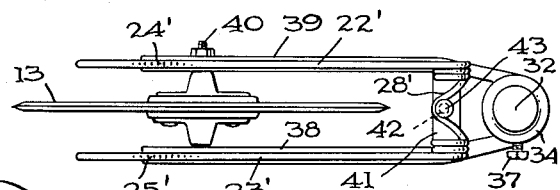
FIG. 5 is a bottom view of the embodiment of the invention shown in FIG. 4

A modified form of the spring structure is shown in FIGS. 4 and 5. In this embodiment there is shown a spring holder adapted to be used with the swivel-type coulter wheel bracket shown in FIG. 1 of the drawing. This bracket comprises a depending, gooseneck rod 31, affixed at its upper extremity to the trailer body. The lower, vertical extremity 32 of rod 31 receives the bored, forward bearing sleeves 33 and 34 of coulter wheel bracket 35. It will be noted that the forward, bored, sleeve extremities 33 and 34 of coulter wheel bracket 35 are preferably disposed in a vertical plane at an angle of some 140° to depending bracket 35. Sleeves 33 and 34 are held in position on extremity 32 of rod 31 by means of a screw-locking lug 36 disposed on extremity 32 between said sleeves. Lug 36 is provided centrally with a locking screw 37 which bears against extremity 32.

It will be noted that in this embodiment coulter wheel bracket 35 makes substantially a 45° angle with the surface of the ground. Coulter wheel 13 is rotatably mounted between the rear extremities of bracket plates 38 and 39 on axle 40.

Figure 6:
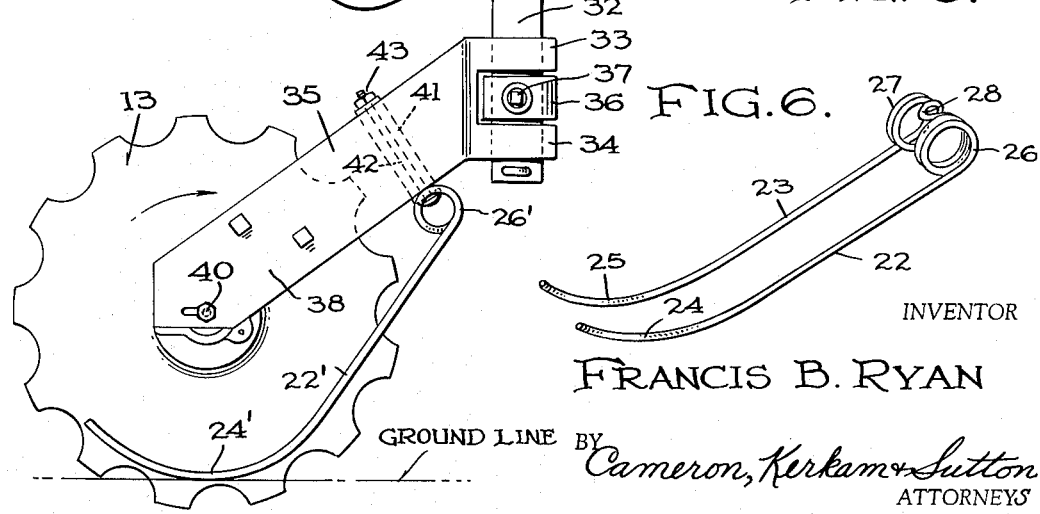
FIG. 6 is a detailed perspective view of a preferred embodiment of the unitary spring trash holding means.

As shown, bracket 35 comprises parallel vertical walls or plates 38 and 39, joined at their forward extremities by cross bar 41 and then reduced forwardly into forward sleeve sections 33 and 34. Rotatably mounted between plates 38 and 39 by means of an axle bolt 40 between the rearward extremities thereof is coulter wheel 13. Mounted ahead of coulter wheel 13 on cross bar 41 of bracket 35 is a modified embodiment of coulter spring member 21, which is here designated as 21', corresponding parts of the spring shown in FIGS. 2 and 6, also being "primed." It will be noted that in this embodiment of the spring holder, due to its elevated mounting position, the lower extremities of arms 22' and 23' are curved upwardly at a more extreme angle to position the apices 24' and 25' of these curved extremities in contact with the ground in proper position with respect to the entering point of coulter wheel 13.

As shown in FIGS. 4 and 5, the center bight 28' at the forward extremity of the spring holder, between springs 26' and 27' thereof is affixed flush under cross bar 41 of coulter wheel bracket 35 by means of a headed bolt 42 provided with a nut 43 at its upper extremity, thus maintaining depending arms 22' and 23' and their apices 24' and 25' in proper position against the surface of the ground laterally of the forward, entering edge of coulter wheel 13.

As has been previously stated, due to the fact that resilient arms 22' and 23' extend rearwardly and downwardly from forward integral spring members 26' and 27' and due to the fact that the apices of their lower curved extremities are so positioned as to bear against the surface of the ground laterally of the forward, entering edge of the coulter wheel, arms 22' and 23' are susceptible of being raised above the surface of the ground by obstructions over which they pass and will exert considerable downward force thereagainst as they pass over such obstructions. Due to the resilient, downward pressure exerted by arms 22' and 23', as they ride over the surface of the ground on the apices of their curved lower extremities 24' and 25', as the coulter wheel reaches ground litter of any kind, the litter will be caught under the forward surfaces of arms 22' and 23' and as the machine proceeds forwardly the ground litter will be progressively compressed downwardly, due to the angularity of arms 22' and 23'. Thus, as it passes under the apices of the lower curved extremities 24' and 25' thereof the litter will be tightly compressed against the ground, permitting the forward, cutting edge of coulter wheel 13 to cut it cleanly, thus eliminating any possibility of clogging or of litter piling-up at the coulter wheel.

As aforesaid, the preferred manner of forming the coulter wheel spring structure is from one length of resilient steel wire in which the center bight 28 is first formed in the center of the wire, the two lateral spring segments 26 and 27 are then wrapped over an appropriate cylindrical mandrel, the last turn of each such spring 26 and 27 being then extended rearwardly into arms 22 and 23, respectively, and the rear extremities thereof are then bent into curved rear segments to form the rear riding surfaces or apices 24 and 25.

When the bracket of the coulter wheel is disposed parallel to the ground, as in the embodiment in FIG. 2, the angularity of the arms 22 and 23 with the ground is quite acute. However, when the coulter wheel is supported by an upwardly extending bracket structure, as in FIG. 4, the curvature of the lower extremities of the arms 22' and 23' must be proportionately increased to provide appropriate bearing points or apices 24' and 25' therefor. Thus, it will be seen that the basic structure of the coulter spring is always the same with the only required modification being in the degree of curvature of the lower extremities of arms 22 and 23, which is governed by the angularity of the coulter wheel bracket with the ground.

The invention is susceptible of numerous embodiments without departing from the spirit thereof. Thus, the spring means may be comprised of separate, flattened, spring steel or plastic arms affixed at their upper extremities to the lower surfaces of the coulter bracket and extending downwardly into upwardly curved segments in contact with the surface of the ground laterally of and adjacent the forward cutting edge of the coulter wheel. Similarly, it could comprise a V-shaped member, spring-supported beneath the lower surface of the coulter bracket with the apex of the V forward of and above the leading edge of the coulter wheel and the curved arms extending laterally thereof into contact with the ground.

The invention is susceptible of alternative embodiments without departing from the spirit thereof.

Attention is directed to the appended claim for a limitation of the scope of this invention.

What is claimed is:

In an improved trash holder means for coulter wheels of ditching and analogous machines, a forward section comprising a spring wire member centrally looped into a horizontally disposed bight and extending laterally to each side of said central bight, doubly curved circular spring sections vertically disposed equidistant at each side of said center bight, elongate parallel and closely disposed spring wire arms extending downwardly and rearwardly from the outer laps of each of said vertical spring sections and upwardly curved in parallel at their lower extremities whereby said arms will lie closely adjacent the sides of a coulter wheel when said bight is affixed forwardly thereof and the apices of said curved arm sections will bear against the ground adjacent the entry point therein of said coulter wheel, the downwardly extending arms acting to force upstanding obstructions progressively downwardly to be held closely to the ground under the apices of the arms for cutting by the coulter wheel.

References Cited by the Examiner

UNITED STATES PATENTS

| 414,789 | 11/1889 | Baird | 172—157 X |
| 575,233 | 1/1897 | Graham | 172—515 X |
| 644,375 | 2/1900 | Steffes | 172—515 |
| 956,653 | 5/1910 | Thompson | 172—516 |
| 2,124,128 | 7/1938 | Strandlund | 172—166 |
| 2,371,674 | 3/1945 | Caminez | 29—173 |
| 2,839,984 | 6/1958 | Knight | 172—166 |
| 2,922,220 | 6/1960 | Sacchini | 29—173 |
| 2,989,129 | 6/1961 | Sisk | 172—515 |
| 3,099,347 | 7/1963 | Dahlquist | 56—400 X |

FOREIGN PATENTS

| 1,090,019 | 9/1960 | Germany. |

ANTONIO F. GUIDA, *Acting Primary Examiner.*

T. GRAHAM CRAVER, ABRAHAM G. STONE,
*Examiners.*

J. R. OAKS, *Assistant Examiner.*